Aug. 6, 1940.  S. E. WOODBURY  2,210,051
VIBRATION ABSORBING MECHANISM
Filed Dec. 23, 1936  4 Sheets-Sheet 1

INVENTOR
Stephen E. Woodbury
By his Attorney
Victor Colb

Aug. 6, 1940.  S. E. WOODBURY  2,210,051
VIBRATION ABSORBING MECHANISM
Filed Dec. 23, 1936  4 Sheets-Sheet 2
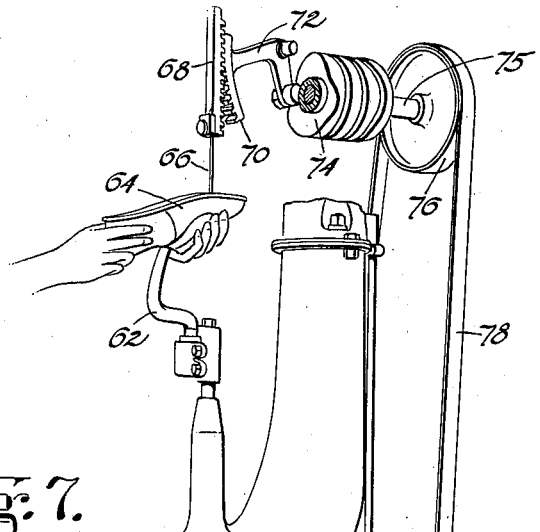
Fig. 7.
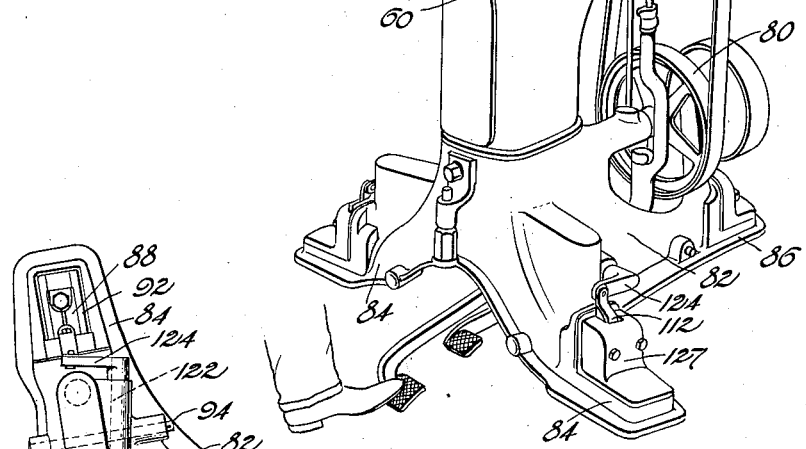
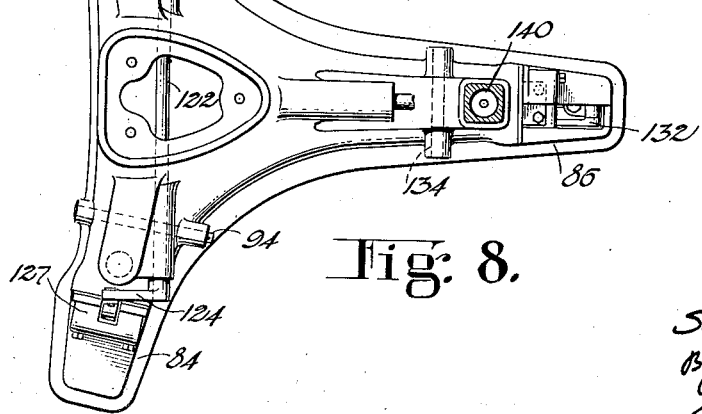
Fig. 8.
INVENTOR:
Stephen E. Woodbury
By his attorney
Victor Cobb.

Aug. 6, 1940.    S. E. WOODBURY    2,210,051
VIBRATION ABSORBING MECHANISM
Filed Dec. 23, 1936    4 Sheets-Sheet 3

INVENTOR
Stephen E. Woodbury
By his Attorney
Victor Cobb

Aug. 6, 1940.   S. E. WOODBURY   2,210,051
VIBRATION ABSORBING MECHANISM
Filed Dec. 23, 1936   4 Sheets-Sheet 4
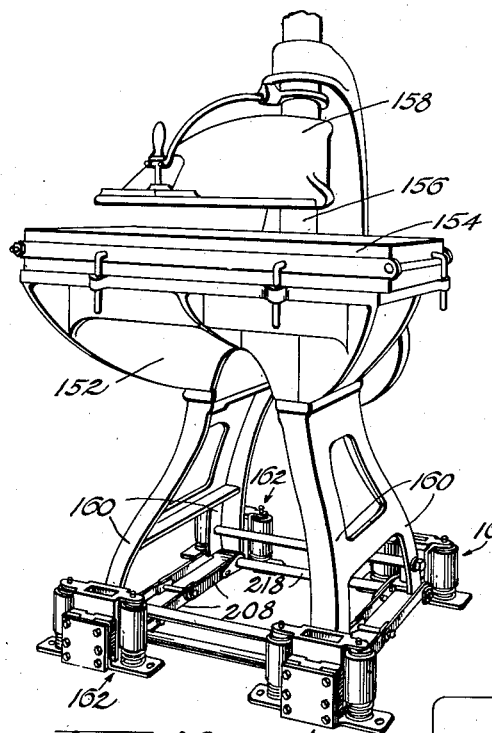
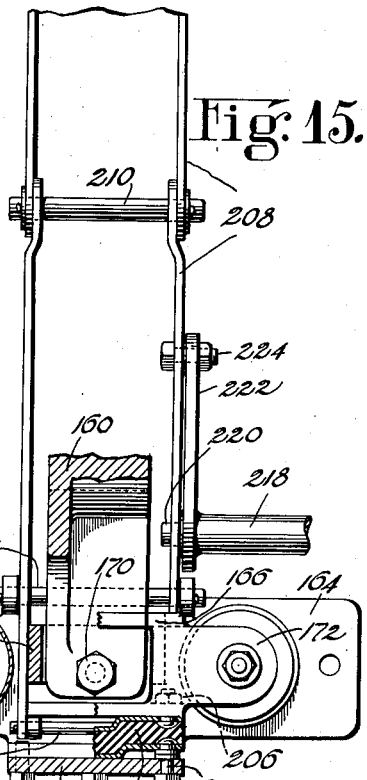
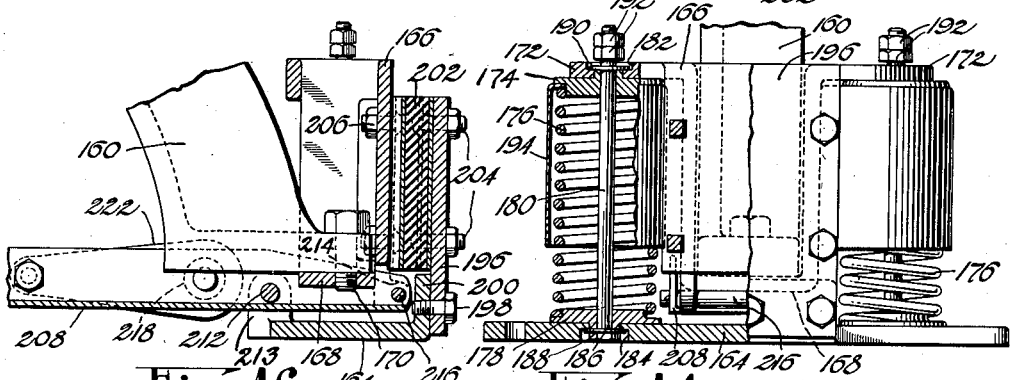
INVENTOR:
Stephen E. Woodbury
By his attorney
Victor Cobb.

Patented Aug. 6, 1940

2,210,051

UNITED STATES PATENT OFFICE 2,210,051

VIBRATION ABSORBING MECHANISM

Stephen E. Woodbury, Beverly, Mass., assignor to United Shoe Machinery Corporation, Borough of Flemington, N. J., a corporation of New Jersey Application December 23, 1936, Serial No. 117,356

12 Claims. (Cl. 248—21)

This invention relates to vibration absorbing and dampening devices and is herein illustrated in connection with bases for supporting shoe machines or other apparatus.

Many of the machines which are used in modern factories are so constructed and are driven at such speeds that vibrations are set up which are transmitted to the floor of a factory with amplitudes sufficiently large to constitute a hazard to the building and which are at least annoying to the occupants of the building and frequently render less effective the operations performed upon nearby machines. The vibration of machines if of sufficiently large amplitude frequently results in oscillations of the operating point of the machine of such character as to cause inaccurate operation of the tools upon the work. Some attempts have been made, with varying degrees of success, to eradicate this difficulty by providing various types of vibration absorbing or dampening devices.

It is an object of the present invention to provide improved vibration absorbing and dampening mechanism which will be particularly effective in reducing the vibrations transmitted to the floor as well as the amplitude thereof.

To this end and as illustrated the invention provides a base for machines in which the entire weight of the machine is supported by resilient means, there being vibration absorbing mechanism in the form of dampers which are normally unstressed but which during the operation of the machine serve to absorb and dampen the vibrations set up. In some instances and as illustrated, I prefer to mount the machine pivotally upon resilient supports and provide compensating connections by which the base of the machine is maintained parallel to the floor.

By use of the mechanism above outlined much of the objectionable effect of vibrations resulting from the operation of machines can be eliminated.

These and other features of the invention are disclosed in the accompanying drawings, are described in the following detailed specification, and are pointed out in the claims.

In the drawings,

Fig. 4 is a plan view of the unit;

Fig. 7 is a perspective view of a loose nailing machine provided with a base embodying another form of my invention;

Fig. 8 is a bottom plan view of the machine illustrated in Fig. 7;

Fig. 13 is a perspective view of a clicking machine provided with a sub-base embodying another form of my invention;

Fig. 14 is a side elevation partly in section of the supporting mechanism and vibration absorbing mechanism for one of the legs of the machine of Fig. 13;

Fig. 15 is a plan view of the mechanism illustrated in Fig. 14; and

Fig. 16 is a side view partly in section of that mechanism.

In general, I have carried out my invention by supporting the entire weight of the machine by metallic springs of such stiffness that the natural frequency of the system is small compared to the impressed frequency resulting from operation of the machine, and using dampers such as rubber dampers to absorb vibrations set up by operation of the machine as well as to take care of extraneous forces acting upon the machine.

Figure 1:
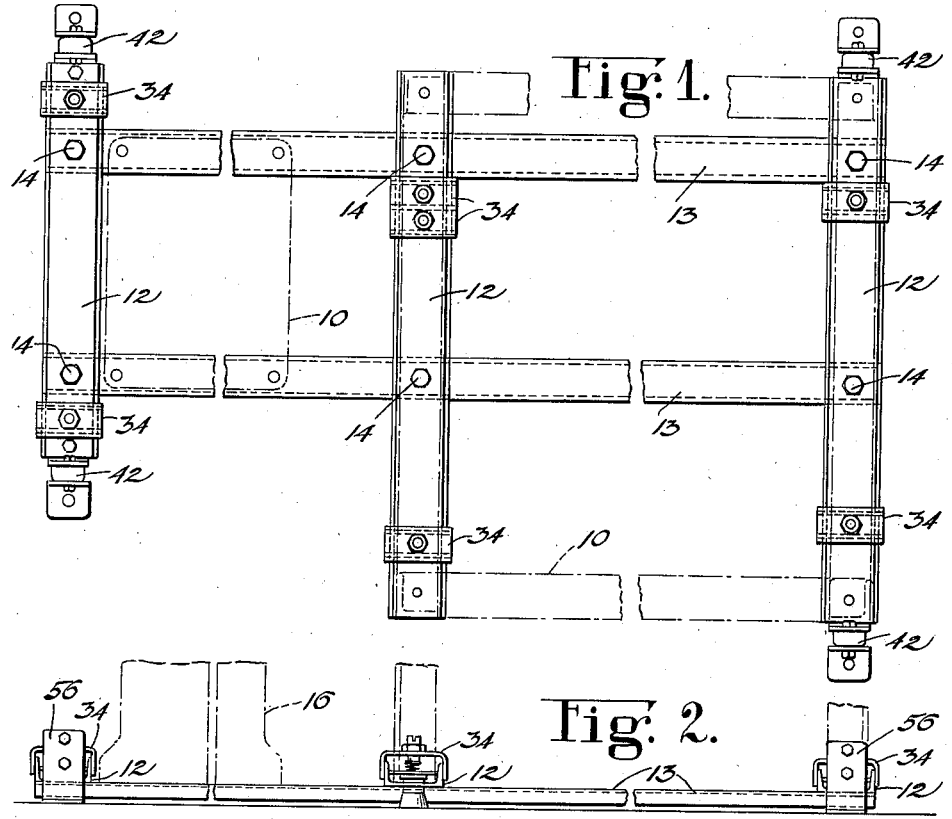
Fig. 1 is a plan view of a machine sub-base embodying one form of my invention.
Figure 2:
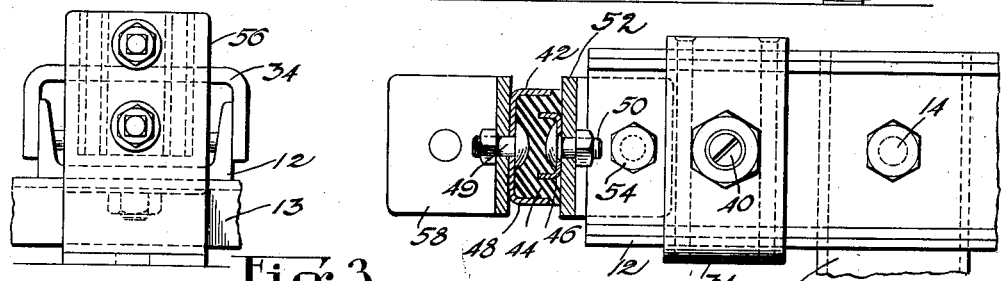
Fig. 2 is a side elevation of the base.
Figure 3:
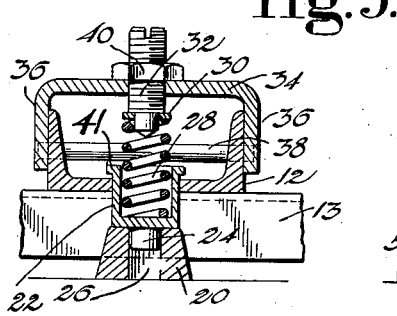
Fig. 3 is an end elevation of one of the vibration absorbing units.
Figures 5, 6:
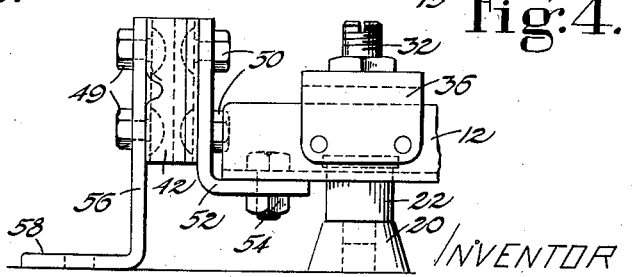
Fig. 5 is a vertical cross sectional view through the unit.
Fig. 6 is a side view of the unit.
Figure 9:
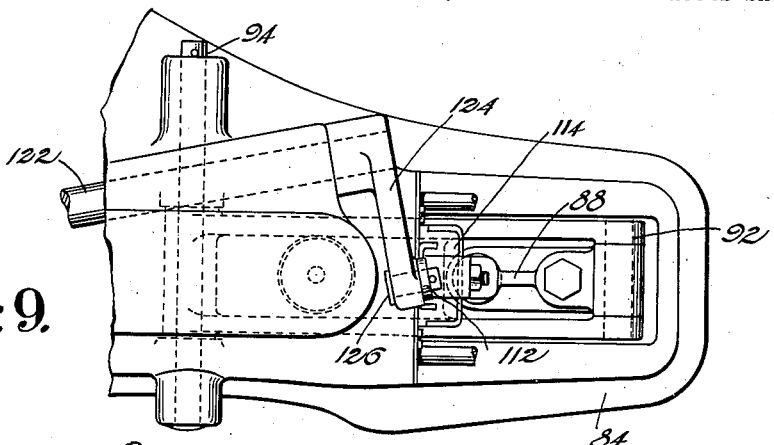
Fig. 9 is a plan view of one of the legs of the machine showing the vibration absorbing unit in position.

One form of mechanism which I have developed for accomplishing this is illustrated in Figs. 1 to 6, inclusive, which disclose a base for a comparatively large machine the lower portion of which is shown in dot and dash lines 10 in Figs. 1 and 2. The base itself comprises a plurality of channel sections 12 and 13 arranged in the form of a truss and secured together by bolts 14. As shown the portions of the channels support a machine column 16 at the left-hand side of the base and the legs of the machine rest upon upper portions of channel members 13. For supporting the base and the machine above the floor I have provided resilient suspension units each of which, as shown in Fig. 5, comprises a socket 20 adapted to rest upon the floor, a spring cup 22 having a depending portion 24 extending into an opening 26 in the socket. Resting upon the bottom of the cup is a spring 28 which bears against a washer 30 carried by a screw 32 extending through a tie plate 34 which has depending flanges 36 fixedly secured to the channel 12 by a pin 38. This construction is such that the tie plate supports the channel and is in turn resiliently supported above the floor by the spring 28. A nut 40 is provided on the screw head 32 for adjusting the position of the machine above the floor and the cup 22 is provided with a flange 41 adapted to engage the upper face of the channel 12 to prevent collapse of the unit during its assembly and adjustment. As shown in Fig. 1 a number of these units are utilized to support the entire weight of the sub-base and the machine which it carries, the units being placed in positions which will insure that the machine will be supported on the level.

In order to dampen and absorb vibrations arising out of operation of the machine several of the units are connected to dampers 42. As shown in Figs. 4 and 6 the damper 42 comprises a block of rubber 44 opposite faces of which have bonded thereto metal plates 46 and 48. The plate 46 is secured by bolts 50 to a bracket 52 which in turn is secured by a bolt 54 to one of the channels 12 at a point adjacent to one of the resilient supporting units. The plate 48 is connected by bolts 49 to a bracket 56 which has a laterally extending flange 58 which is preferably secured rigidly to the floor.

The spring constant of the springs 28 is so chosen with respect to the natural frequency of the system and with respect to the impressed frequency initiated by operation of the machine that the base and machine will oscillate in a heightwise direction at a low frequency. The dampers 42 are chosen with regard to their lateral stiffness so as to operate to retain the machine in position on the floor without considerably increasing the forces transmitted to the floor. In this connection it is to be noted that in assembling the dampers the bolts 32 are tightened until the spring pressure of the springs 28 has been adjusted to raise the machine above the floor to the extent that the bolts 50 can be inserted and tightened without placing any strain upon the damper either in a heightwise or a lateral direction. Accordingly, there is normally no static load upon the dampers. When vibrations are set up due to operation of the machine the dampers will be in position to absorb them along vertical planes as when the bracket 52 is shifted heightwise of the bracket 56, thus placing a strain upon the damper which has a tendency to move the bracket in the opposite direction. The dampers are similarly effective in absorbing vibrations in other planes and prevent or absorb vibrations of the machine which would cause movement of the bracket directly toward or away from the bracket 56 in a horizontal plane.

Figure 10:
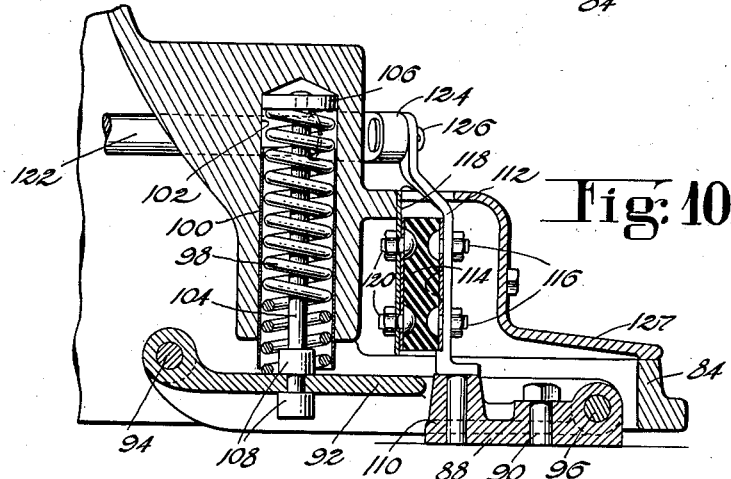
Fig. 10 is a vertical cross section through the leg shown in Fig. 9.

Figs. 7, 8, 9, 10, 11 and 12 illustrate a modification of the invention as applied to a loose nailing machine. As shown in Fig. 7 the machine comprises a frame 60 which carries a work support in the form of a horn 62 adapted to support a shoe such as shoe 64 in operative position relatively to a driver 66 illustrated diagrammatically as being arranged to be reciprocated by a rack 68 adapted to engage a sector 70 carried by a bell-crank lever 72 arranged to be oscillated by a cam 74 on a shaft 75 rotated by a pulley 76 driven by a belt 78 from a driving pulley 80. The frame 60 is carried by a base 82 which has two forwardly projecting legs 84 and a rear leg 86. As best shown in Fig. 10 each of the forward legs is carried by a foot 88 adapted to be secured to the floor by a bolt 90. The load on each of the forward legs is carried by a lever 92 pivoted to the leg at 94 and pivoted to the foot 88 at 96, there being a spring 98 positioned within a guide tube 100 in an opening 102 in the body portion of the leg. The spring 98 is arranged to surround a safety rod 104 which, at its upper end, carries a washer 106 bearing upon the upper extremity of the wall of the opening 102, there being retaining nuts 108 on the rod 104 located upon opposite sides of the lever 92. At one side of the foot 88 is a boss 110 adapted to receive the lower end of a vertically extending bracket 112 to which is secured a rubber damper unit 114 by means of bolts 116, the opposite side of the unit being secured to a frame bracket 118 by means of bolts 120. This construction is such that the forward portion of the machine is supported by means of the spring 98, lever 92 and feet 88, the dampers 114 being effective to absorb and dampen vibrations set up by a disturbing force acting upon the machine frame.

In order to maintain the driver 66 or the operating point substantially in a vertical plane there is provided a compensating device comprising a rod 122 which extends laterally through the base 82 and has arms 124 at each end thereof which are pivotally connected to the brackets 112 at 126. This construction is such that if there is a tendency to move one of the forward legs downwardly or upwardly relatively to the central portion of the frame of the machine the movement will be transmitted through the rod 122 to the other side thereof with the result that that side will tend to move in the same direction. Thus, both of the forward legs 84 will be maintained equidistant from the floor regardless of movement thereof in a heightwise direction. In view of this the driver 66 will be maintained in a vertical plane although it may move slightly angularly in that plane about the rear portion of the machine. Preferably the damper mechanism is protected by means of a cap 127 secured to the frame.

Figure 12:
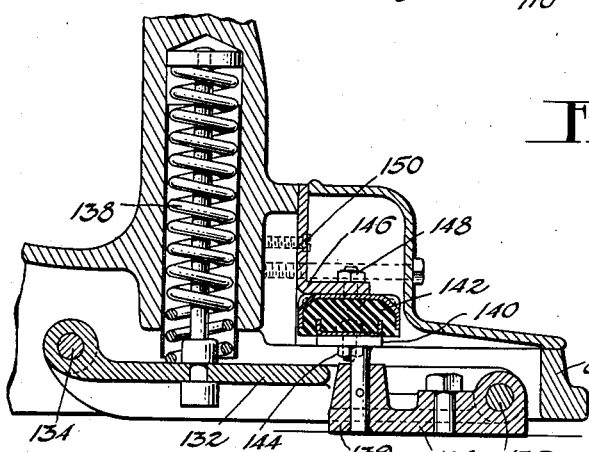
Fig. 12 is a vertical cross section through the leg shown in Fig. 11.
Figure 11:
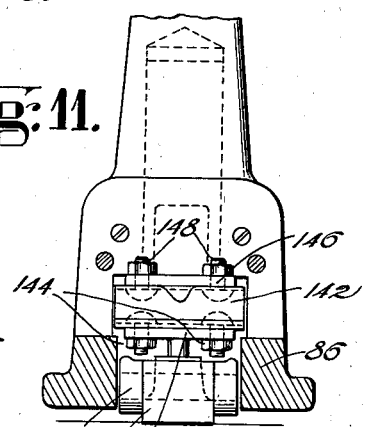
Fig. 11 is an end view in end elevation of the rear leg of the machine shown in Fig. 7.

The rearward portion of the machine is supported by a foot 128, best shown in Fig. 12, the leg 86 being supported from the foot by means of a lever 132 which is pivoted to the leg at 134 and to the foot at 136, there being a spring 138, similar to that illustrated in Fig. 10, which supports the rearward portion of the machine. The foot 128 has a boss 139 which supports a bracket 140 upon which is positioned a rubber damper 142 secured to the bracket by bolts 144 and secured to a frame bracket 146 by means of bolts 148, the frame bracket being secured to the leg 86 by bolts 150. In this instance the rubber damper 142 is arranged to receive the direct thrust due to varying heightwise positions of the rear portion of the machine and in the position shown is effective in producing a resistance to the pull of the belt 78.

It is to be noted that the entire weight of the machine is supported by the springs 98 and 138 which are preferably so selected as to spring scale that their natural frequency of vibration is low and that the damping members 114 and 142 serve to absorb the vibrations produced both at the operating point and at the rearward portion of the machine which, in the latter case, results from the belt pull.

Figs. 13, 14, 15 and 16 illustrate another modification of my invention, namely a vibration absorbing sub-base, particularly adapted for use in connection with clicking machines. There is shown in Fig. 13 a clicking machine comprising a frame 152 having a work supporting bed 154, and a reciprocating post 156 which carries a presser arm 158 which is adapted to apply pressure to a die which may be located upon work such as sheet material positioned upon the bed 154. The frame of the machine is supported by four legs 160, each of which in turn is supported by a vibration absorbing and damping unit 162.

Each of these units comprises a base plate 164 to which supporting mechanism is secured. This mechanism comprises a bracket 166 having a lateral projection or lug 168 to which a leg of the machine is secured by means of a bolt 170. The bracket 166 has laterally extending ears 172 which rest upon plates 174 supported by springs 176 resting upon the spring perches 178 in contact with the base plate 164. Each of the springs 176 surrounds a safety rod 180 which extends through an opening 182 in an ear 172 and through an opening 184 in the base plate, there being a washer 186 and a nut 188 for retaining the lower portion of the rod in position in the base plate and there being a washer 190 positioned in the opening 182 and adjustable nuts 192 upon the rod for limiting the expansion of the spring prior to its assembly in the machine. Each of the springs is positioned in a tubular guide 194 which serves to protect the same and prevent it from spreading in a lateral direction.

This construction is arranged to support the entire weight of the machine and to permit it to oscillate in a heightwise direction at a low frequency.

In order to absorb the vibrations of the machine due to its operation there are provided dampers which form integral parts of the machine supporting units.

To this end, and as best shown in Fig. 16, there is a bracket 196 secured by bolts 198 to an upturned edge portion 200 of each base plate 164. Secured to the bracket is a rubber damper 202 held in position by bolts 204, the damper being secured at its opposite side to the bracket 166 by means of bolts 206. This construction provides for the absorption and damping of vibrations transmitted to the dampers during operation of the machine. In this connection it is to be noted that since the entire weight of the machine is carried by the springs 176 when the machine is not in operation the dampers 202 are not under stress but that when an external disturbing force is applied the dampers will tend to absorb it regardless of the direction in which it acts, thus making an effective vibration damping device.

In order to maintain the bed of the machine substantially parallel to the floor regardless of the direction and extent of forces supplied to the bed, I have provided compensating members in the form of channel sections 208 which are respectively connected to the pairs of legs at opposite sides of the machine. The channel sections are respectively loosely pivoted to each other at 210 and their outer ends are pivoted at 212 in lugs 213 projecting from the bracket 164 and are secured to ears 214 on the bracket 166 by a pivot pin 216. By this arrangement force operating upon one of the legs of the machine to raise or lower it will cause a similar raising or lowering of the corresponding leg at the opposite end of the machine. Preferably and as shown, the two sets of compensating members are operatively connected so that force acting on any one of the legs to raise or lower it will result in a corresponding raising or lowering of the entire machine. To this end, I have provided compensating rods 218 extending between the two sets of channel members and being secured thereto by pins 220 and an arm 222 which is secured to a channel member by means of a bolt 224. This construction is such that any force which tends to raise or lower one of the legs 160 will be transmitted through the channel members 208 and compensating member 218 to each of the other legs with the result that each leg will be raised or lowered through the same distance.

Having described my invention, what I claim as new and desire to secure by Letters Patent of the United States is:

1. A base for machines comprising a plurality of frame members arranged to carry a machine, supporting feet, springs carried by the feet and engaging portions of the frame members for supporting the entire weight of the machine, brackets secured to the floor, the springs being of a stiffness so related to the weight of the machine that the natural frequency of vibration of the system is low compared to the frequency of vibration of the machine during its operation, and normally unloaded rubber dampers secured to the brackets and to the frame members and connected between the brackets and frame members so as to be subjected to shear upon movement of the machine heightwise of the floor for damping vibrations set up during the operation of the machine.

2. A base for machines comprising a machine supporting frame, brackets carried by the frame, supporting feet resting upon the floor, springs extending between the feet and the brackets, the springs being of a stiffness so related to the weight of the machine that the natural frequency of vibration of the system is low compared to the frequency of vibration of the machine during its operation, members carried by the brackets and engaging ends of the springs for varying the heightwise position of the frame relatively to the floor, and rubber damping members positioned between the frame and the floor and arranged so as to be subjected to shear upon movement of the machine heightwise of the floor.

3. A base for machines comprising a plurality of supporting feet secured to the floor, a lever pivoted to each of the feet and to the frame of the machine, a spring engaging each of the levers and a portion of the frame thereby resiliently to support the entire weight of the machine, and rubber dampers positioned between the feet and the frame to dampen vibrations caused by the operation of the machine.

4. A support for machines comprising a plurality of feet, levers pivotally connected to the feet and to the frame of the machine, springs extending between the frame and the levers whereby the entire weight of the machine is resiliently supported upon the feet, brackets carried by two of the feet, and means for maintaining predetermined portions of the machine in the same vertical plane comprising a rod extending horizontally through the frame and having arms at the ends thereof pivotally connected to the brackets.

5. A support for machines comprising a plurality of base members, springs extending between the base members and the frame of the machine for supporting the entire weight of the machine, brackets carried by the base members, and a compensating member comprising a rod engaging a portion of the frame and mounted upon the brackets for angular movement into various positions parallel to the base members.

6. A base for machines comprising a plurality of supporting units each of which is adapted to engage and support a leg of a machine, each of said units comprising a base plate, springs carried by the plate, a bracket resting upon the springs and having a portion adapted to receive and support a leg of the machine, and a damper between the base plate and the bracket and secured thereto, and a system of levers connecting the several brackets of the units to maintain the brackets and legs of the machine parallel to the floor irrespective of their heightwise position.

7. A support for machines comprising a plurality of base plates each of which is associated with a leg of a machine to be supported above the floor, a plurality of springs resting upon each of the base plates, brackets supported upon the springs, each of the brackets being secured to a leg of the machine, compensating connections between the brackets comprising two pivotally connected members pivotally mounted near their ends upon base plates and pivotally connected to the brackets in such manner that variation in heightwise movements of one of the brackets will be communicated through the members to the other bracket.

8. A supporting unit for machines comprising a base plate, a plurality of springs resting upon the plate, and a bracket resting upon the springs and having a projection adapted to receive and support a portion of a machine.

9. A supporting unit for machines comprising a base plate, a plurality of springs carried by the plate, a bracket resting upon the springs and having a projection adapted to receive and support a portion of a machine, a second bracket secured to the base plate, and a rubber damper positioned between and secured to the two brackets.

10. A supporting unit for machines comprising a base, springs resting upon the base, a bracket having a body portion located between the springs and having lateral projections resting upon the springs, the body portion of the bracket having means for engaging and supporting a leg of a machine, a second bracket extending heightwise of the base, and a rubber damper positioned between the two brackets and secured thereto.

11. A supporting unit for machines comprising a base, springs resting upon the base, a bracket having a portion positioned between the springs and adapted to engage and support a leg of a machine, the bracket having lateral projections resting upon the upper ends of the springs, rods extending lengthwise of the springs through the lateral projections of the bracket and through the base, and locking means at opposite ends of the rods to limit the extension of the springs when the bracket is unloaded.

12. A mounting for machines comprising a plurality of springs arranged to support the entire weight of a machine above a fixed support, the springs being of a stiffness so related to the weight of the machine that the natural frequency of vibration of the system is low compared to the frequency of vibration of the machine during its operation, and a normally unloaded rubber damper positioned between the machine and the fixed support and connected between the machine and fixed support so as to be subjected to shear upon movement of the machine in directions heightwise of the support.

STEPHEN E. WOODBURY.